J. A. SCHLEHR.
UTENSIL KNOB.
APPLICATION FILED MAR. 26, 1917.
1,265,967.
Patented May 14, 1918.
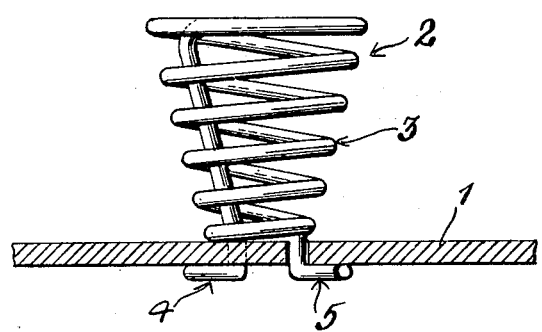
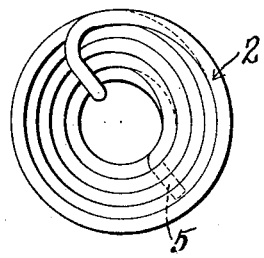
Witness
J. Ralph Hogl
Inventor
J. A. SCHLEHR
By H. B. Willson & Co
Attorneys

UNITED STATES PATENT OFFICE.

JOSEPH ANTHONY SCHLEHR, OF CHICAGO, ILLINOIS.

UTENSIL-KNOB.

1,265,967.      Specification of Letters Patent.      Patented May 14, 1918.

Application filed March 26, 1917. Serial No. 157,547.

*To all whom it may concern:*

Be it known that I, JOSEPH A. SCHLEHR, a citizen of the United States, residing at Chicago, in the county of Cook and State of Illinois, have invented certain new and useful Improvements in Utensil-Knobs; and I do declare the following to be a full, clear, and exact description of the invention, such as will enable others skilled in the art to which it appertains to make and use the same.

This invention relates to improvements in knobs adapted for use on cooking utensils, stove doors, and the like, and has reference more particularly to a device of this class fashioned from a length of wire bent spirally.

The primary object of this invention is to provide a device of this character which will not become heated as readily as will knobs used at the present time.

Another object is to provide a device of this character wherein the tendency toward retaining heat rising from the stove or cooking utensil is reduced to a minimum by forming said device in the shape of a spiral having an open top.

With these and numerous other objects in view, my invention resides in the novel features of construction, and in the combination and arrangement of the several parts as illustrated in the accompanying drawings and more particularly pointed out in the specification and claim.

In the accompanying drawings:—

Figure 1 is a side elevation of my device applied to a utensil cover or plate which is shown in section;

Fig. 2 is a top plan view of the device.

Similar numerals of reference are employed to indicate like parts throughout the several views. Reference is now had to the drawings in which a utensil cover 1 is shown provided with a spirally formed knob 2.

The knob 2 is composed of a single strand of wire 3 which is bent spirally into inverted truncated cone-shape. Each of the substantially horizontally disposed coils are spaced vertically and from the lower end of the knob body to its upper end the coils are increased in diameter, as illustrated in the drawings, so as to provide an open top, whereby the knob will not only be less adapted to retain heat but will be more easily grasped when it is desired to remove the cover. When the coil at the upper end of the knob is completed, the end 4 of the wire is bent downwardly through the body to form attaching means therefor. The end 5 of the wire forming the lower coil is bent at right angles to the coil and is adapted to be inserted in an aperture in the utensil cover 1. The other end 4 of the wire 3 is adapted to be extended through a second aperture spaced from the other aperture in the cover. The ends of the wires are bent in opposite directions, so as to securely fasten the knob to the cover. A major portion of the lower coil of the body contacts said cover or plate to retain the knob in proper position.

Although the drawings illustrate the knob as being applied to a utensil cover, it is readily seen that it may be used with equal advantage in connection with stove doors and the like.

From the foregoing description of the construction and operation of my new and improved utensil cover knob, the manner of applying the same to use and its operation will be readily understood, and it will be seen that I have provided a simple and efficient device of this character for carrying out the objects of my invention.

I claim:—

A device of the character described for attachment to a plate, said plate being provided with a pair of spaced apertures, and said device consisting of an inverted truncated cone-shaped body formed of a single strand of wire bent into vertically spaced substantially horizontal coils, each coil from the lower to the upper end of said body being increased in diameter to provide an open top for said cone-shaped body, the upper extremity of said wire being bent downwardly through the body adjacent the inclined wall thereby forming a brace for the same and the lower extremity of said wire being bent at right angles and adapted to be inserted through one of said apertures, the lower coil of said cone-shaped body having a major portion contacting with said plate the extremity of the wire forming said lower coil being bent at right angles to said coil, said bent portion adapted to be inserted through the other aperture in said plate to hold the device securely thereon.

In testimony whereof I have hereunto set my hand in the presence of two subscribing witnesses.

JOSEPH ANTHONY SCHLEHR.

Witnesses:
 A. W. KUME,
 D. W. BROWN.